(12) United States Patent
Hoppe et al.

(10) Patent No.: US 7,150,405 B2
(45) Date of Patent: Dec. 19, 2006

(54) METHOD AND DEVICE FOR PRODUCING A PORTABLE DATA CARRIER

(75) Inventors: Joachim Hoppe, Munich (DE); Arno Hohmann, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 260 days.

(21) Appl. No.: 10/478,634

(22) PCT Filed: May 27, 2002

(86) PCT No.: PCT/EP02/05802

§ 371 (c)(1),
(2), (4) Date: May 20, 2004

(87) PCT Pub. No.: WO02/096646

PCT Pub. Date: Dec. 5, 2002

(65) Prior Publication Data

US 2004/0217177 A1    Nov. 4, 2004

(30) Foreign Application Priority Data

May 30, 2001    (DE) ................................ 101 26 368

(51) Int. Cl.
*G06K 19/02*    (2006.01)

(52) U.S. Cl. ...................... 235/488; 235/487; 235/380

(58) Field of Classification Search ................. 235/487, 235/488, 380
See application file for complete search history.

(56) References Cited

U.S. PATENT DOCUMENTS 5,034,081 A    7/1991    Aizawa et al.
6,715,797 B1 *  4/2004    Curiel .......................... 283/67

FOREIGN PATENT DOCUMENTS

| AU | B-63708/90 | 4/1991 |
| DE | 39 32 505 C2 | 4/1991 |
| DE | 196 47 153 A1 | 5/1998 |
| EP | 1 046 515 A | 10/2000 |
| WO | WO 96/15912 A2 | 5/1996 |
| WO | WO 00/50238 A1 | 8/2000 |
| WO | WO 01/29764 A1 | 4/2001 |

* cited by examiner

*Primary Examiner*—Karl D. Frech
(74) *Attorney, Agent, or Firm*—Rothwell, Figg, Ernst & Manbeck, P.C.

(57) ABSTRACT

A method for producing a multilayer data carrier (1) having a surface structure (2) embossed at least in certain areas on one side. In the method, a first multilayer semifinished product (3) is first produced into which the surface structure (2) is embossed. The semifinished product (3) is then connected with a second multilayer semifinished product (4) or a further layer (17) with interposition of an adhesive layer (5). Furthermore, a corresponding manufacturing plant is described.

22 Claims, 2 Drawing Sheets

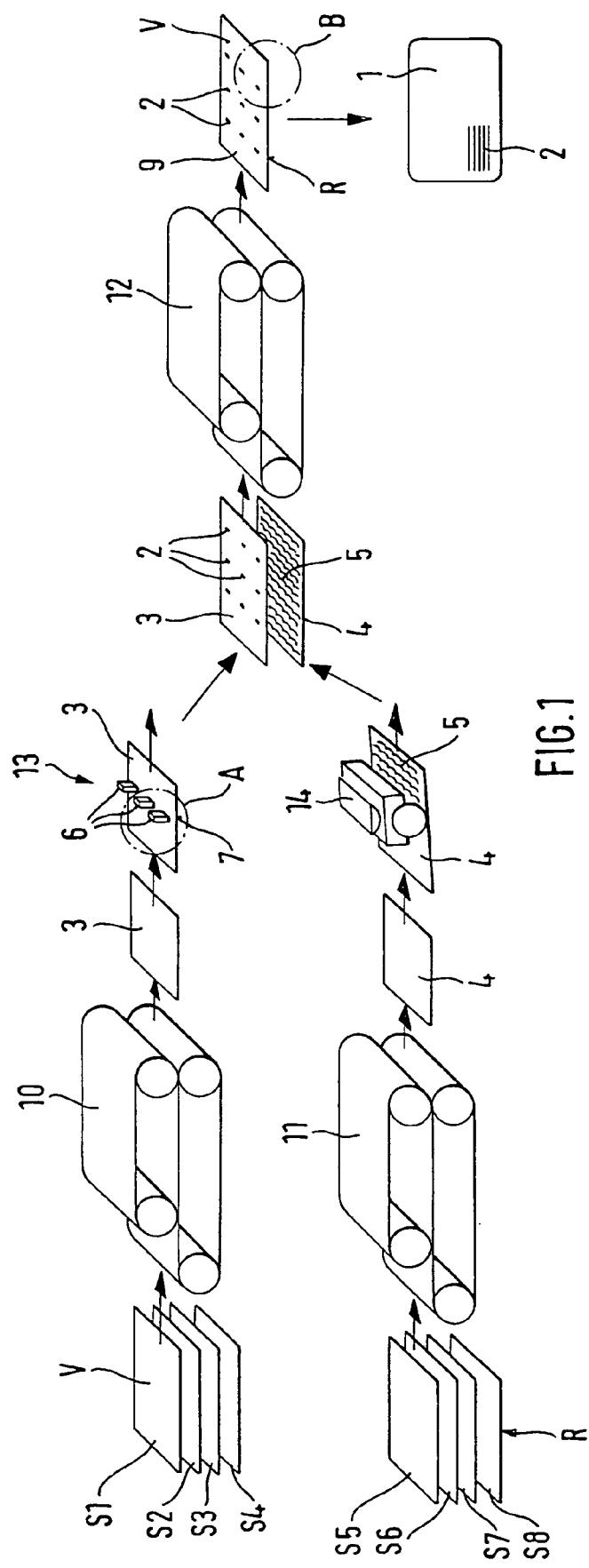
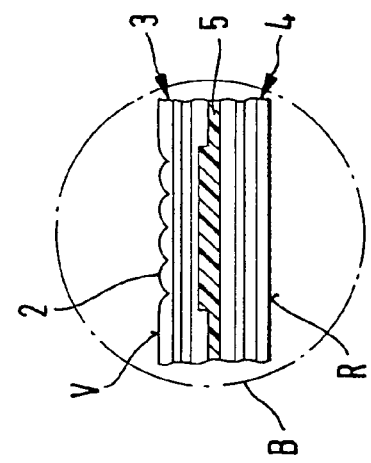
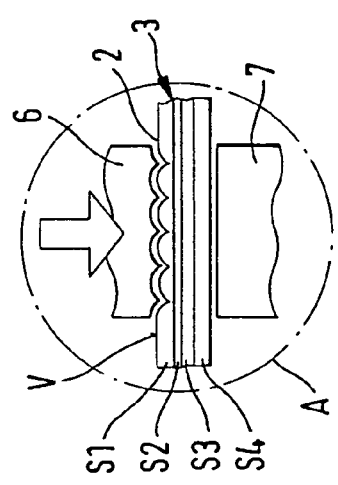

METHOD AND DEVICE FOR PRODUCING A PORTABLE DATA CARRIER

CROSS-REFERENCE TO RELATED APPLICATION

This application is a §371 of PCT Application Serial No. PCT/EP02/05802, filed May 27, 2002.

BACKGROUND OF THE INVENTION

1. Field of the Invention

This invention relates to a method for producing a portable data carrier having a surface structure embossed at least in certain areas on one side, the data carrier being produced by joining a plurality of layers.

2. Description of the Background Art

To impede or prevent forgery or manipulation of data carriers such as ID cards, credit cards, Eurocheque cards or the like, such data carriers are provided with special security features. The security features used are preferably ones having a striking, readily visible but uncopiable visual effect, on the one hand, and allowing maximally cost-effective production of the data carriers, on the other hand. Such a security feature is for example a surface structure embossed into the surface of an ID card in the form of a lens structure through which different images, so-called "tilt images," are visible at different angles of vision. The lens structure is embossed into a transparent cover layer of the data carrier. It is preferably a cylindrical lens screen. Through said lens screen, information is incorporated by means of a laser into volume areas of the data carrier body located thereunder, said information being readily recognizable visually as blackened areas. Due to the focal effect of the lenses, only narrowly limited areas of the data carrier are blackened so that the information can only be observed at the viewing angle corresponding to the angle of incidence of the laser on the lens structure. It is thus possible to use different inscription angles to inscribe several pieces of information each recognizable only at certain viewing angles, thereby producing the "tilt image" effect. Such security features are known as MLIs (multiple laser images). MLIs are either difficult or impossible to copy, so that forgeries or manipulated data carriers are recognizable immediately and without great effort.

The abovementioned data carriers having a multilayer, i.e. at least two-layer, structure—as is usually the case with chip cards—are normally produced by a laminating plate technology by which the individual data carrier layers are placed one above the other between two laminating plates and laminated under the action of heat and pressure. DE 196 47 153 A1 describes methods for producing a surface structure on the multilayer data carrier to be produced simultaneously with the laminating process by means of an embossing structure formed on the laminating plate. In addition it states methods by which a thermostable embossing plate is inserted between the cover layer of the data carrier and the laminating plate during the laminating process.

A further possibility for producing the abovementioned data carriers is to emboss the finished single cards after production.

All these known methods of embossing the surface structure into the finished data carrier during or after the laminating process have the disadvantage that the embossing process can fundamentally damage the data carrier in the form of warps and deformations. This considerably increases the reject rate during production.

SUMMARY OF THE INVENTION

It is the problem of the invention to specify a method and manufacturing plant allowing incorporation of surface structures into a data carrier in simple and cost-effective fashion without the finished data carrier being damaged.

This problem is solved by a method having the features of claim 1 and by an apparatus having the features of independent claim 12. Further advantageous embodiments and expedient developments of the invention are given by the features of the dependent claims.

According to the invention, the embossing process for producing the surface structure is performed on a prelaminated semifinished product. Then the card is completely built up using an adhesive layer, i.e. by "cold joining." Since the back of the semifinished product opposite the surface embossing is on the inside during completion of the card buildup, deformations arising from the embossing process are insignificant. Any embossing deformations that occur can be evened out by the adhesive layer on the back of the embossed semifinished product. Therefore, in the inventive method the embossing process itself can be adjusted with respect to the process parameters such as pressure, temperature and embossing time-primarily for producing optimal molding qualities of the surface structure, without the otherwise necessary compromises having to be found between a useful quality of the surface structure and deformations on the back of the data carrier body. The embossing is preferably performed so as to produce a surface-flush surface structure, i.e. the surface structure is flush with the data carrier surface or its highest level is below the data carrier surface. This makes the data carriers easy to stack and gives them a low-wear surface.

In a preferred embodiment, the first semifinished product provided with the embossing is connected with a second semifinished product into which a surface structure was likewise embossed before connection. This technique permits large-surface lens embossings to be realized for both sides of the data carrier without the embossing process impairing the surface qualities of the other side.

In a further preferred embodiment, a counter-embossing is produced in and/or on the side of the semifinished product opposite the surface embossing. This is preferably done simultaneously with the embossing of the surface structure into the surface of the semifinished product by using an embossing device in which the counter die opposite the actual embossing die and pressing against the back of the semifinished product is likewise provided with a structure. As an alternative or in addition to such a counter-embossing, embossings taken from special layers can be done. For example, it is expedient in the case of transparent structures to perform a transfer embossing of a laser recording layer onto the back of the semifinished product in order to inscribe the desired images or other information into this layer in a following step for producing a MLI. The embossing can also be taken from certain color layer or the like. Such embossings can be performed for example by means of transfer bands extending between the back of the semifinished product and the counter die.

In a variant of the method, an especially thin first semifinished product is produced by applying a plastic layer for embossing the surface structure to a thin layer of material, for example a paper layer or thin-film foil, in certain areas. Said plastic layer can be applied to the paper web or thin-film foil for example in the form of a label, it being expedient to use a transfer embossing method. It is advantageous for the embossing of the surface structure to be done simultaneously with the transfer embossing. Such a semifinished product can be used to produce a thin-film data carrier having a surface structure in simple fashion.

The invention will be explained in more detail hereinafter by embodiments with reference to the drawing, in which:

BRIEF DESCRIPTION OF THE DRAWINGS

FIG. 1 shows a representation of a procedure for producing a data carrier,

FIG. 2 shows a partial section through a semifinished product during embossing at position A in the procedure according to FIG. 1, FIG. 3 shows a partial section through a finished data carrier compound at position B in the procedure according to FIG. 1.

DETAILED DESCRIPTION OF THE INVENTION

Figure 4:
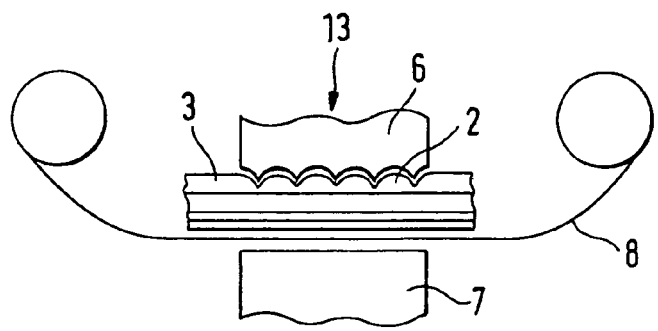
FIG. 4 shows a cross section through a semifinished product during surface embossing with simultaneous transfer embossing of a layer to the back of the semifinished product.

FIG. 1 shows a procedure for producing multilayer data carrier 1 by joining semifinished products 3, 4, semifinished products 3, 4 each being produced in the form of semifinished sheets with a plurality of copies. Hereinafter the form of a semifinished sheet will always be assumed for semifinished products 3. Instead of semifinished sheets, corresponding semifinished webs can also be produced, e.g. in the form of endless bands.

The first phase of the production method shown in FIG. 1 is the production of semifinished sheet 3, 4. A plurality of stacked similar or different layers S1 to S4 is connected into multilayer semifinished sheet 3 in first connecting station 10. Connecting station 10 is executed as a hot laminating zone, preferably permitting continuous lamination.

Desired surface structure 2 is then embossed into multilayer semifinished sheet 3 in following embossing station 13. Embossing is expediently done so that surface structure 2 is flush with the surface, here front V of semifinished sheet 3. Surface structure 2 is preferably a lens structure, as described above.

The embossing process is shown enlarged in FIG. 2. Embossing station 13 has embossing die 6 with a negative of desired surface structure 2 and counter die 7 disposed opposite. To permit surface structure 2 to be incorporated more easily into the plastic material of semifinished product 3, embossing die 6 is heated to a certain temperature.

Upper layer S1 of semifinished product 3 can be a transparent layer. Layer S2 located thereunder is then for example a layer that can be inscribed by a laser with a certain wavelength. Embossing station 13 expediently comprises several embossing dies 6 and counter dies 7, disposed for example side by side in rows and columns, so that surface structure 2 can be embossed simultaneously for each copy on semifinished sheet 3.

From embossing station 13 semifinished sheet 3 is brought together with second multilayer semifinished sheet 4 for example via transport bands. Second semifinished sheet 4 was expediently made analogously to semifinished sheet 3, as indicated in FIG. 1, i.e. likewise produced from a plurality of layers S5 to S8 in hot laminating zone 11.

In a following step, second semifinished sheet 4 is provided on one side with adhesive layer 5 in coating station 14. The side of second semifinished sheet 4 opposite adhesive layer 5 forms later back R of finished data carrier 1.

The two semifinished sheets 3 and 4 are then brought together so that adhesive layer 5 is located between semifinished sheets 3, 4 and surface structure 2 embossed into semifinished sheet 3 is on the outside. Thus united semifinished sheets 3, 4 are transferred to joining station 12 having a cold laminating zone. Therein, semifinished sheets 3, 4 are pressed together and connected by the effect of adhesive layer 5. During the pressing process the temperature is controlled so that adhesive layer 5 or optionally one or more accordingly prepared layers S2 to S8 soften, on the one hand, while surface structure 2 located on semifinished sheet 3 is not damaged, on the other hand.

The pressing process in joining station 12 levels out unevenness on the inside back of semifinished sheet 3. At the output of joining station 12, finished card compound 9 is present in the form of a sheet in which a plurality of data carriers 1 are expediently set side by side in several columns and rows.

FIG. 3 shows an enlarged cross section through such a card compound 9 in the area of surface structure 2. Front V and back R are accordingly in totally planar relation and have no deformation whatsoever apart from surface structure 2. Any deformations produced on the back of first semifinished product 3 under surface structure 2 by counter die 7 in embossing station 13 have been completely evened out above all by adhesive layer 5.

In a final step, individual data carriers 1 are detached from card compound 9, for example cut or punched out, in a suitable punching or cutting device. The final product is data carrier 1 having desired surface structure 2.

Hereinabove only the method steps essential for producing data carrier 1 have been described. Within the procedure or at the end thereof, further method steps can also be inserted or added, such as method steps for incorporating a functional element, in particular a chip module, into data carrier 1 or method steps by which information is inscribed by means of a laser through surface structure 2 for producing a tilt image.

Likewise, it is possible to modify the procedure within the framework of the described basic concept. For example, adhesive layer 5 can also be applied to the back of first semifinished product 3 facing away from surface structure 2. It is also possible to use a two-component adhesive and apply the two components separately to the two semifinished sheets 3, 4 so that the components only react with each other when semifinished sheets 3, 4 are joined. It is likewise possible to use e.g. only one hot laminating zone where both first semifinished sheet 3 in which surface structure 2 is embossed and second semifinished sheet 4 are laminated. In this case, semifinished sheets 3, 4 are subsequently supplied to the further stations or brought together via different transport paths and/or banks.

FIG. 4 shows a variant of embossing station 13. Here, a coating is embossed on the back of first semifinished sheet 3 by means of counter die 7 simultaneously with the embossing of surface structure 2. For this purpose transfer band 8, i.e. a carrier band, extends between the back of semifinished sheet 3 and counter die 7, said band having on the side facing the back of semifinished sheet 3 a coating that is transferred to the back of semifinished sheet 3 in the area of counter die 7 during embossing. The coating can be for example a laser-sensitive layer, a conductive structure or a color layout. The use of a laser-sensitive layer or color layout is expedient in particular when semifinished sheet 3 itself is constructed of transparent material. In a further variant, counter die 7 likewise has an embossing structure.

If the requirements for the quality of surface evenness are somewhat lower, the production method described here is suitable for cost-effective production of especially thin semifinished products 15. A form of the method that is suitable for this purpose is illustrated in FIGS. 5 to 7.

The basis for semifinished products 15 to be produced is now paper web 17 or alternatively a thin-film foil. Plastic layer 16 is applied to paper web 17 in certain areas where surface structure 2 is subsequently to be embossed. Plastic layer 16 is prepared in label form preferably by punching and consists of individual labels 20. Labels 20 are formed on carrier tape 21 which is unwound from roll 23.

Figure 6:
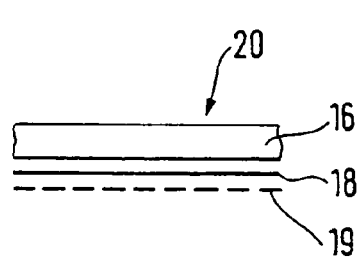
FIG. 6 shows a section through the label-shaped plastic layer for application to the thin layer of material according to FIG. 5.
Figure 7:
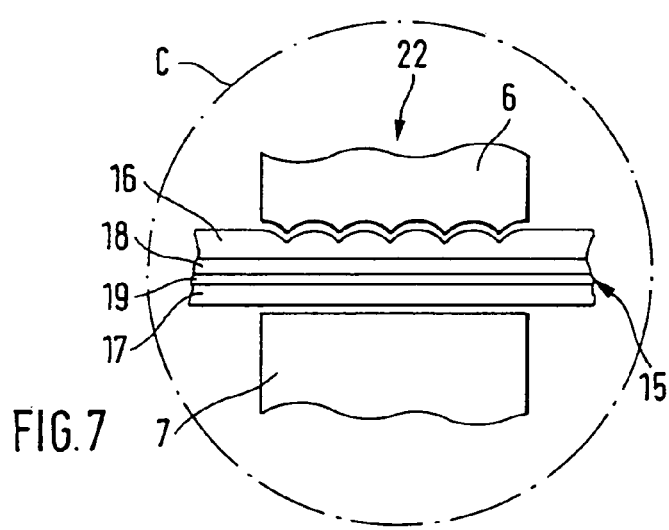
FIG. 7 shows a partial section through the thin-film semifinished product during simultaneous surface-structure and transfer embossing at position C in FIG. 5.

FIG. 6 shows an enlarged view of the layer structure of labels 20. It consists of plastic layer 16 for receiving surface structure 2, laser-sensitive recording layer 18 located thereunder, and heat seal layer 19 located thereunder for connection with paper web 17.

Figure 5:
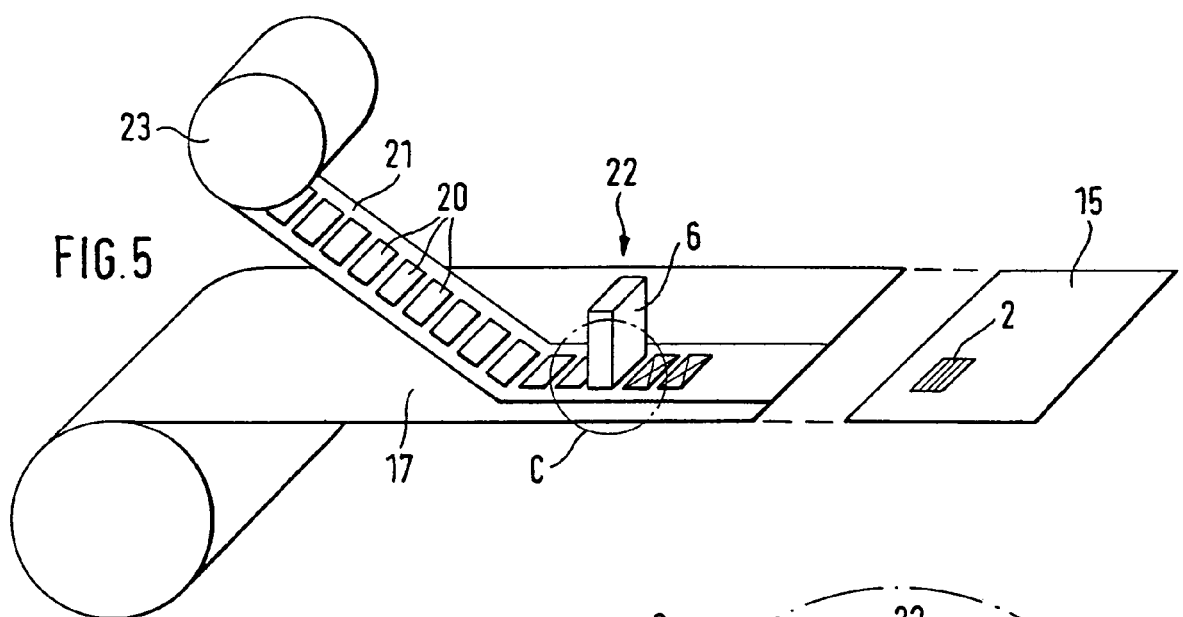
FIG. 5 shows a representation of a transfer embossing of a label-shaped plastic layer to a thin layer of material for producing a thin-film semifinished product.

The joining of labels 20 with paper web 17 and the embossing of surface structure 2 are integrated in single connecting station 22 in the form of the method shown in FIG. 5. Therein, surface structure 2 is embossed into plastic layer 16 and label 20 applied to paper web 17 under the action of heat by a transfer embossing process simultaneously. Alternatively, it is again also possible to initially perform the embossing of surface structure 2 in a first step and then apply plastic layer 16 or label 20 to paper web 17 in a following step.

The outgoing product is complete semifinished product 15 with a thin structure having at a desired position a plastic layer with surface embossing 2. Semifinished product 15 can already form portable data carrier 1. Surface structures 2 suitable for application in a combined transfer/embossing process are MLIs.

The invention offers altogether a reliable-process method with high product security for producing any desired surface structures on a great variety of data carriers.

The invention claimed is:

1. A method for producing a portable data carrier having a surface structure embossed on one side, the data carrier being produced by joining a plurality of layers, characterized by the following steps:
   producing a first multilayer semifinished product,
   embossing the surface structure into the semifinished product and connecting the semifinished product bearing a surface structure with a second semifinished product with interposition of an adhesive layer, said adhesive layer evening out any embossing deformations arising on the back of the semifinished product during embossing.

2. A method according to claim 1, characterized in that the first semifinished product is produced by a laminating method.

3. A method according to claim 1, characterized in that the second semifinished product is formed by a single layer.

4. A method according to claim 1, characterized in that the second semifinished product is constructed of a plurality of layers.

5. A method according to claim 4, characterized in that the counter-embossing comprises an application of a layer of material.

6. A method according to claim 1, characterized in that on the finished data carrier the surface structure covers only a partial area of the surface thereof.

7. A method according to claim 1, characterized in that a surface structure is likewise embossed in the second semifinished product before connection.

8. A method according to claim 1, characterized in that a counter-embossing is produced in the side of the semifinished product opposite the surface embossing.

9. A method according to claim 8, further characterized in that a counter- embossing also is produced on the side of the semifinished product opposite the surface embossing.

10. A method according to claim 1, characterized in that a plastic layer for embossing the surface structure is applied to a thin layer of material at least in certain areas for producing a first semifinished product.

11. A method according to claim 10, characterized in that the surface structure is embossed into the semifinished product upon a connection of different layers of the semifinished product.

12. An apparatus according to claim 10, characterized in that the embossing station and/or the second embossing station has means for producing a counter-embossing on the side of the semifinished product opposite the surface embossing.

13. An apparatus according to claim 12, characterized in that the means for producing the counter-embossing comprise means for applying a layer of material.

14. A method according to claim 1, characterized in that the first semi-finished product is a semifinished sheet with a plurality of copies,
   the surface structures for the individual copies are embossed in the semifinished sheet
   the semifinished product is then connected with a sheet shaped second semifinished product or a sheet shaped further layer so as to form a data carrier compound,
   and subsequently individual data carriers are detached from the data carrier compound.

15. A method according to claim 1, characterized in that a counter-embossing is produced on the side of the semifinished product opposite the surface embossing.

16. A method according to claim 1, characterized in that the first semi-finished product is a semifinished web with a plurality of copies,
   the surface structures for the individual copies are embossed in the semifinished web,
   the semifinished product is then connected with a web-shaped second semifinished product or a web-shaped further layer so as to form a data carrier compound,
   and subsequently individual data carriers are detached from the data carrier compound.

17. A manufacturing plant for producing portable data carriers having an embossed surface structure on one side, having
   a connecting station for joining different layers of the data carrier, an embossing station for embossing the surface structure,
   a first connecting station for producing a first semifinished product from a plurality of layers,
   an embossing station following the first connecting station for embossing the surface structure into the first semifinished product, and a joining station following the embossing station for connecting the first semifinished product with a second semifinished product with interposition of an adhesive layer, characterized in that the joining station is designed for pressing together the semifinished products, at the same time permitting a temperature control by which the adhesive layer is softened.

18. An apparatus according to claim 17, characterized in that the joining station is preceded by a coating station for applying the adhesive layer to the further layer or to at least one of the first semifinished product or the second semifinished product.

19. An apparatus according to claim 17, characterized by a second connecting station for producing the second semifinished product from a plurality of layers.

20. An apparatus according to claim 17, characterized by a second embossing station preceding the joining station for embossing a surface structure into the second semifinished product.

21. An apparatus according to claim 17, characterized in that the embossing station and the joining station are combined into a joint connecting station and the embossing of the surface structure is effected during the connection of different layers of the semifinished product.

22. An apparatus according to claim 17, characterized by a punching and/or cutting station following the joining station.

* * * * *